United States Patent
Lee et al.

(10) Patent No.: US 7,265,518 B2
(45) Date of Patent: Sep. 4, 2007

(54) METHOD OF AUTOMATICALLY CUTTING OFF POWER IN CASE OF LOW BATTERY VOLTAGE IN MOBILE ELECTRONIC UNIT

(75) Inventors: Yoo-shin Lee, Seoul (KR); Sung-youp Lee, Seoul (KR); Hun-young Ryu, Busan Metropolitan (KR)

(73) Assignee: Samsung Techwin Co., Ltd., Changwon (KR)

( * ) Notice: Subject to any disclaimer, the term of this patent is extended or adjusted under 35 U.S.C. 154(b) by 331 days.

(21) Appl. No.: 10/760,824

(22) Filed: Jan. 20, 2004

(65) Prior Publication Data
US 2004/0150372 A1  Aug. 5, 2004

(30) Foreign Application Priority Data
Jan. 20, 2003 (KR) .................... 10-2003-0003793

(51) Int. Cl.
*H02J 7/04* (2006.01)
*H02J 7/00* (2006.01)
*G01R 15/00* (2006.01)
*G01R 31/36* (2006.01)
*G06F 19/00* (2006.01)
*G06F 11/30* (2006.01)
*G04F 1/00* (2006.01)
*G21C 17/00* (2006.01)

(52) U.S. Cl. .......... 320/134; 702/57; 702/65; 702/178; 702/189; 713/340; 320/148

(58) Field of Classification Search ................. 320/148, 320/133, 155, 157, 134, 136; 396/277, 301, 396/3; 455/150; 702/57–65, 178–189; 713/340
See application file for complete search history.

(56) References Cited

U.S. PATENT DOCUMENTS

| | | | | |
|---|---|---|---|---|
| 5,811,890 | A | * | 9/1998 | Hamamoto .................. 307/66 |
| 2002/0006045 | A1 | * | 1/2002 | Shirai et al. .................. 363/17 |
| 2003/0204776 | A1 | * | 10/2003 | Testin .......................... 714/14 |

* cited by examiner

Primary Examiner—Karl Easthom
Assistant Examiner—Yalkew Fantu
(74) Attorney, Agent, or Firm—Drinker Biddle & Reath LLP (57) ABSTRACT

A method for automatically cutting off power in case of a low battery voltage in a mobile electronic unit is provided. The method comprises (a) cutting off the power of the mobile electronic unit when a battery voltage is detected in a first check section during a booting period of the mobile electronic unit that is not in a normal state, and (b) cutting off the power of the mobile electronic unit when the battery voltage detected with respect to the first check section is in the normal state and when a battery voltage is detected in a second check section during a period after booting of the mobile electronic unit is completed that is not in the normal state.

19 Claims, 8 Drawing Sheets

METHOD OF AUTOMATICALLY CUTTING OFF POWER IN CASE OF LOW BATTERY VOLTAGE IN MOBILE ELECTRONIC UNIT

This application claims priority to Korean Patent Application No. 2003-3793, filed on Jan. 20, 2003, in the Korean Intellectual Property Office, the disclosure of which is incorporated herein in its entirety by reference.

FIELD OF THE INVENTION

The present invention relates to a mobile electronic unit, and more particularly, to a method of automatically cutting off the power to a mobile electronic unit by determining the presence of low battery voltage using a battery voltage detection unit during the booting period of the mobile electronic unit and during a period after booting is completed.

BACKGROUND OF THE INVENTION

A digital camera, which is a type of mobile electronic unit, works on a fundamentally different concept than an existing film-type camera. The digital camera photographs a subject through an optical lens system and stores the corresponding photographed image information as digital data in a memory card. The digital data stored in the memory card can be processed in a desired format using a computer and can be easily transmitted via a network. Thus, the demand for digital cameras is expected to substantially increase.

The digital camera operates using power supplied from an AC adapter or a battery. A primary battery, such as an alkaline or lithium, and a secondary battery, such as a lithium-ion (Li-ion) or lithium hydrogen, have been widely used. A nominal voltage and an internal capacity of the secondary battery are higher than those of the primary battery, and thus, the secondary battery can guarantee a more stable operation in case of a low battery voltage. However, if the digital camera uses a current higher than a standard consumption current, such as during a flash check after Iris, shutter 1, and shutter 2 in a low battery voltage, the primary battery does not withstand the load. (In a camera with a two-stage shutter release, the shutter 1 mode operates by an ON signal of a first switch in a two-stage shutter release button for use in performing the camera's AE/AF operations and the shutter 2 mode operates by an ON signal of a second switch in the two-stage button arrangement.) Thus, the operating stability of a variety of IC (integrated circuit) units, such as a digital signal processing unit and a microcontroller of the digital camera, cannot be guaranteed, and communication errors between the IC units occur. In order to prevent the digital camera from malfunctioning, the power should be cut off when low battery voltage is present.

SUMMARY OF THE INVENTION

The present invention provides a method of automatically cutting off the power of a mobile electronic unit by determining that a low battery voltage is present by using a battery voltage detection unit during the booting period of the mobile electronic unit and during a period after the booting is complete.

Another embodiment of the present invention is directed to a method of automatically cutting off the power in a mobile electronic unit when a battery voltage is detected in a first check section during a booting period of the mobile electronic unit that is not in a normal state.

A further embodiment of the present invention is directed to a method of automatically cutting off the power of a mobile electronic unit when the battery voltage detected in the first check section is in the normal state and when a battery voltage is detected in a second check section during a period of time after the booting period of the mobile electronic unit is completed that is not in a normal state.

Preferably, the first check section includes at least one of a first sub-section which corresponds to an on-time section of primary elements at an initial stage of booting, and a second sub-section including a driving period of elements where a current higher than a standard consumption current is used.

The method of automatically cutting off the power of a mobile electronic unit of the present invention further includes (a1) checking the battery voltage before a predetermined time from a starting time of the second sub-section; (a2) checking the battery voltage after a predetermined time from an ending time of the second sub-section; and (a3) generating a power cutting off signal when a difference between the battery voltages checked in steps (a1) and (a2) is more than a predetermined reference value.

Preferably, the second check section includes at least one of a third sub-section which corresponds to a stabilization period after booting of the mobile electronic unit is completed, a fourth sub-section including a driving period of elements at an initial stage of a predetermined operation mode, and a fifth sub-section including a performance period of an operation mode where a current higher than a standard consumption current is used.

The method of automatically cutting off the power of a mobile electronic unit also includes (a) checking the battery voltage before a predetermined time from a starting time of the fourth sub-section; (b) checking the battery voltage after a predetermined time from an ending time of the fourth sub-section; and (c) generating a power cutting off signal when the difference between the battery voltages checked in steps (a) and (b) is greater than a predetermined reference value.

Preferably, the method of the present invention further includes comparing a battery voltage detected during a performance period of an operation mode where a current higher than a standard consumption current is used with a threshold voltage and generating a power cut-off signal when the detected battery voltage is less than the threshold voltage for more than a predetermined number of times.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method of automatically cutting off the power in case of a low battery voltage according to an embodiment of the present invention will be described in detail with reference to the accompanying drawings.

Figure 1:
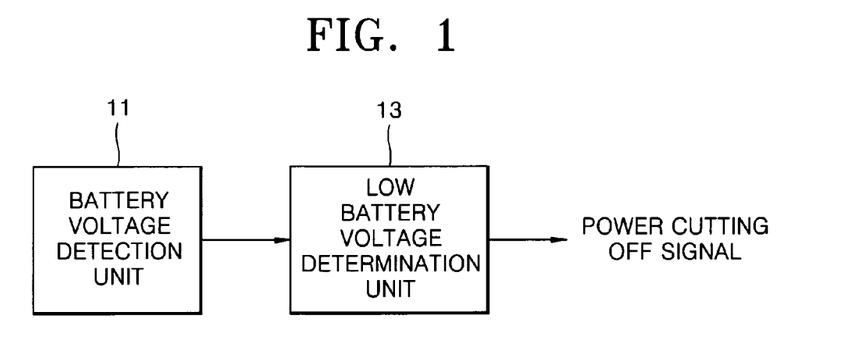
FIG. 1 shows an apparatus using a method of automatically cutting off power in case of a low battery voltage, according to the present invention.

FIG. 1 shows an apparatus using a method of automatically cutting off the power in case of a low battery voltage. The apparatus includes a battery voltage detection unit 11 and a low battery voltage determination unit 13.

The battery voltage detection unit 11 measures the amount of voltage of a battery unit (not shown) and divides the amount by two, resulting in figure referred to as a "voltage value." The battery voltage detection unit 11 transmits the voltage value to the low battery voltage determination unit 13. The low battery voltage determination unit 13 corresponds to a microcontroller of a mobile electronic unit, for example, a digital camera. An algorithm for automatically cutting off the power in case of a low battery voltage is stored in the low battery voltage determination unit 13. According to the algorithm, the normal state or low voltage state of the battery is determined by comparing the voltage value to a predetermined set of values according to the specification of the corresponding mobile electronic unit. If it is determined that the battery is in a low voltage state, a power cutting off signal is generated that cuts off the power supplied to a power supply unit (not shown).

Figure 2:
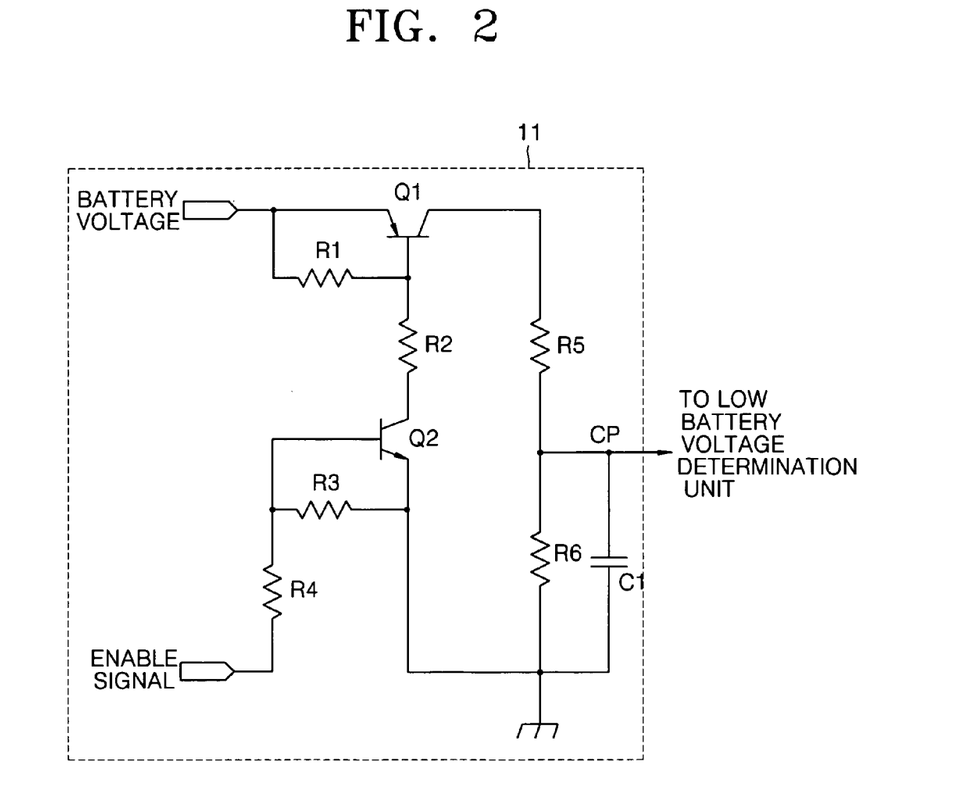
FIG. 2 is a circuit diagram showing a structure of a battery voltage detection unit of FIG. 1.

FIG. 2 is a circuit diagram showing a structure of a battery voltage detection unit 11 of FIG. 1. The battery voltage detection unit 11 includes a first and second transistor Q1 and Q2 and a first through sixth resistors R1 to R6. When the power switch of the mobile electronic unit such as a digital camera is turned on, an enable signal is applied to the base terminal of the second transistor Q2 via a resistor R4, and the second transistor Q2 is turned on. As such, a battery voltage applied to an emitter terminal of the first transistor Q1 is divided by two voltage-division resistors R5 and R6 that are connected to a collector terminal of the first transistor Q1. A connection point CP between the resistors R5 and R6 becomes a check point CP of the battery voltage. A capacitor C1 is connected between check point CP and ground. When resistors R5 and R6 are designed to have the same resistance, the battery voltage is divided exactly in half. If two alkaline batteries having a nominal voltage of 1.5V are used, the battery voltage ranging from about 1.5V to 1.0V is checked at the check point CP.

Figure 3:
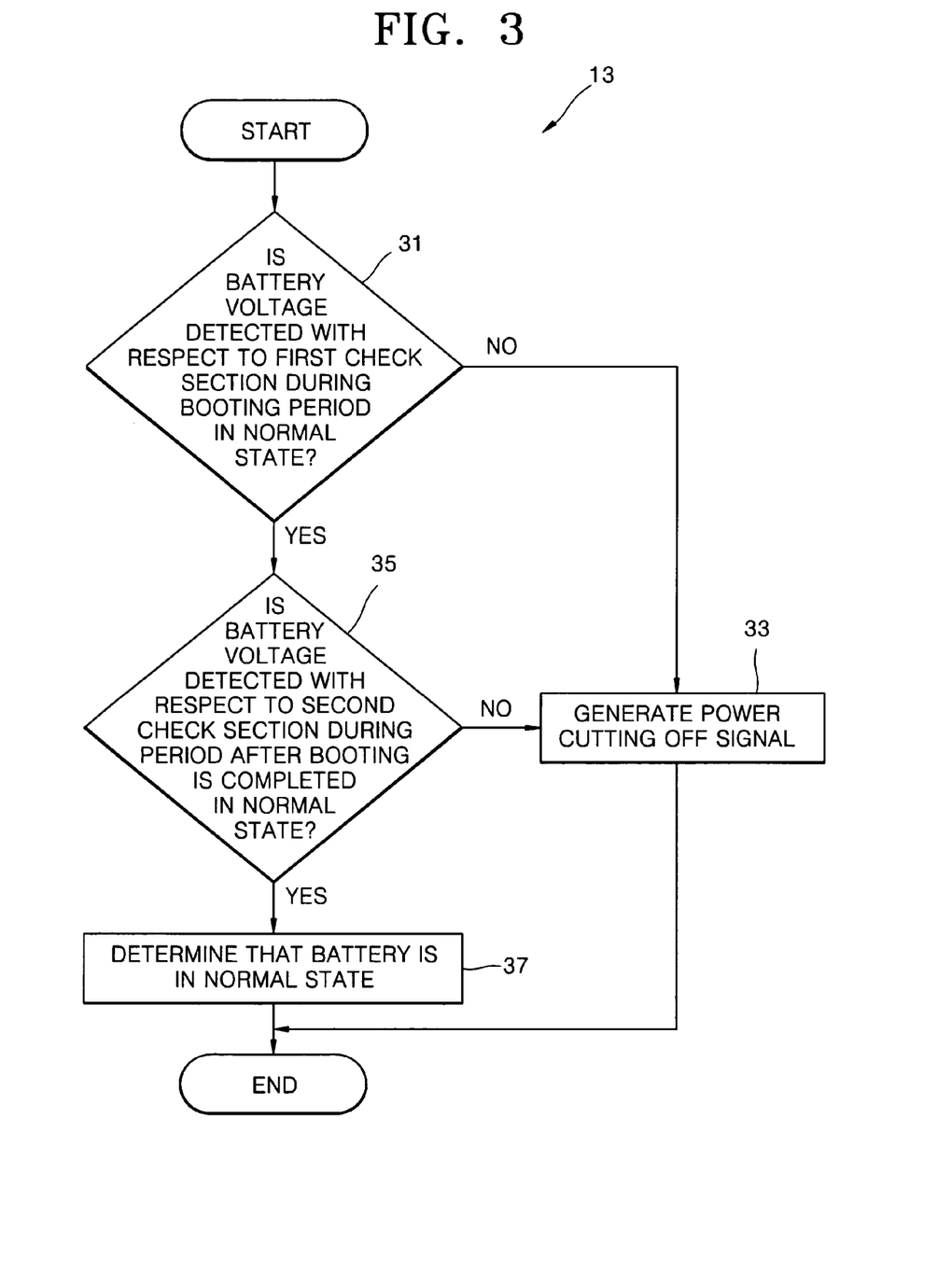
FIG. 3 is a flowchart of the method of automatically cutting off power in case of a low battery voltage, according to an embodiment of the present invention.

FIG. 3 is a flowchart of the method of automatically cutting off the power when a low battery voltage is present, according to an embodiment of the present invention. The method illustrated by FIG. 3 is performed by the low battery voltage determination unit 13.

In FIG. 3, step 31 refers to the step wherein the low battery voltage determination unit 13 determines in, a first check section during the booting period of a mobile electronic unit if the battery voltage is in a normal state. If the battery voltage determination unit 13 determines that the battery voltage is not in the normal state, in step 33, a signal to cut off the power of the mobile electronic unit is generated. The first check section includes at least one of a first sub-section which corresponds to an on-time section of primary elements at an initial stage of booting and a second sub-section including a first driving period of elements where a current higher than a standard consumption current is used. In the case of a digital camera, the primary elements that drive the first sub-section, are a power supply unit, an LCD, and a CCD. The second sub-section includes the charging section of the flash capacitor during the booting period. In the first sub-section, if the checked battery voltage is less than a predetermined reference value, that is, about 1.17V, then the battery is considered to be in a low voltage state, and the power cutting off signal is generated. The predetermined reference value will vary, depending on the specifications of the mobile electronic unit. In the second sub-section, a low voltage state of the battery voltage is determined by a method which will be described later in FIG. 4.

If the battery voltage detected by the first check section is in the normal state (Step 31), then in Step 35, the low battery voltage determination unit 13 determines in a second check section after the booting of the mobile electronic unit is completed whether a battery voltage is in the normal state. The second check section includes at least one of a third sub-section which corresponds to a stabilization period after booting of the mobile electronic unit is completed, a fourth sub-section including a driving period of elements at an initial stage of a predetermined operation mode, and a fifth sub-section including a performance period of an operation mode where a current higher than a standard consumption current is used. In case of the digital camera, the fourth sub-section includes a shutter driving section at an initial stage of a photographing mode, and the fifth sub-section includes a charging section of the flash capacitor after a maximum light-emitting photographing mode is executed. As a result of step 35, if the battery voltage is not in the normal state, in step 33, a signal to turn off the power of the mobile electronic unit is generated. As a result of step 35, if the battery voltage is in the normal state, in step 37, a determination is made whether the battery is in the normal state, indicating that the battery is operating according to an operation mode. Step 37 will be described later. In the third sub-section a signal to cut off the power is generated when the checked battery voltage is less than a predetermined reference value, that is, a threshold voltage, i.e., a minimum voltage of, for example, an alkaline battery at which it is possible for the mobile electronic unit to be normally operated. In the fourth and fifth sub-sections, a low voltage state of the battery voltage is determined by a method which will be described later with respect to FIG. 4.

In Step 33, a signal is generated to cut off the power of the power supply, resulting in the power being turned off or a warning sound being generated.

Figure 4:
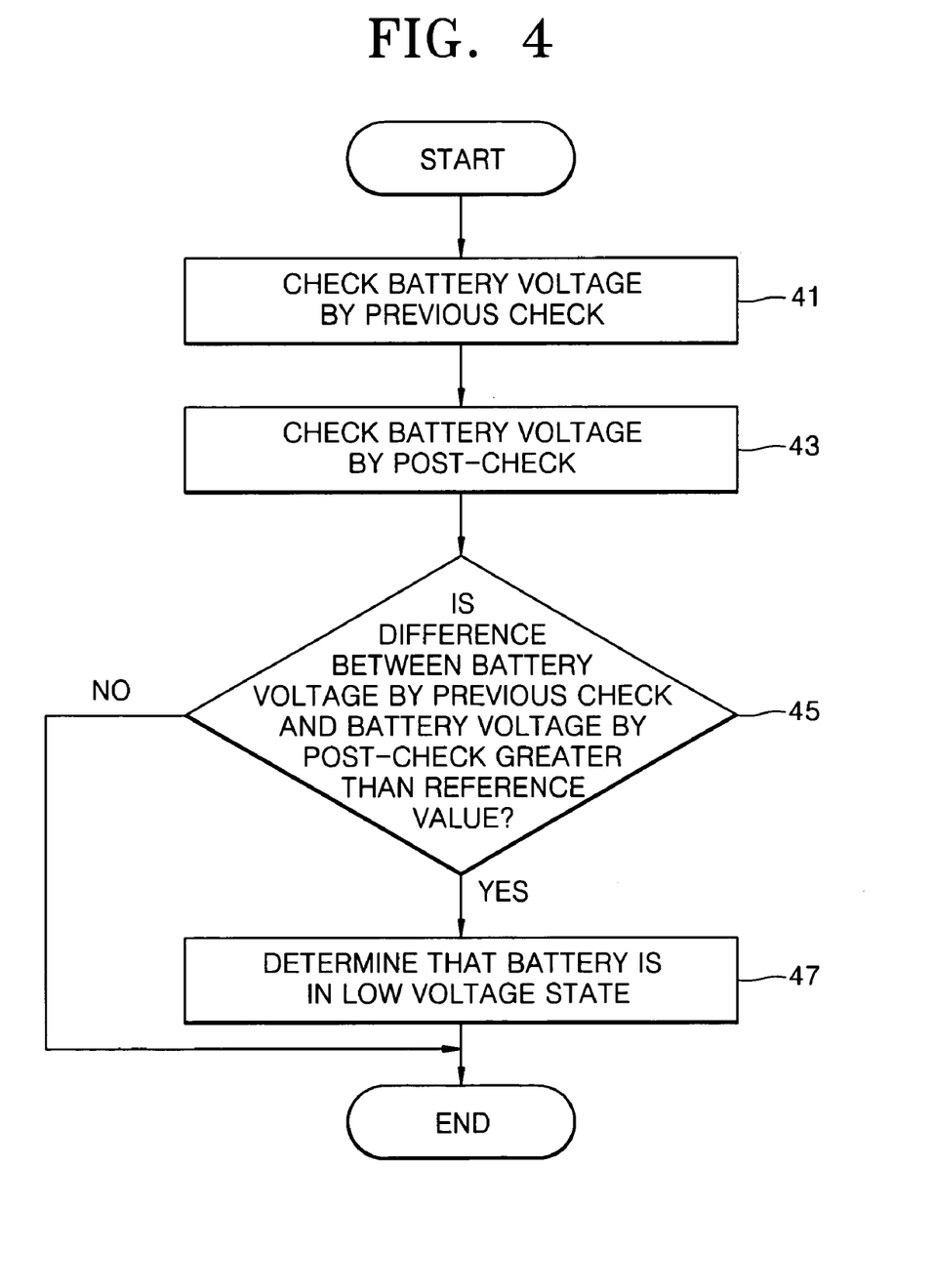
FIG. 4 is a flowchart showing in detail a method of determining a low battery voltage, which is performed in steps 31 and 35 of FIG. 3.

FIG. 4 is a flowchart showing in detail a method of determining a low battery voltage, which is performed in steps 31 and 35 of FIG. 3. Referring to FIG. 4, in step 41, the battery voltage is checked at a predetermined time, for example, 25 ms prior to each starting time of the second sub-section, the fourth sub-section and the fifth sub-section. In step 43, the battery voltage is checked at a second predetermined time, for example, 25 ms after each ending time of the second sub-section, the fourth sub-section and the fifth sub-section. The predetermined time will vary, depending on the specification of the particular mobile electronic unit.

In step 45, the difference between the battery voltages checked in steps 41 and 43 is compared with a predetermined reference value, for example, 50 mV. As a comparison result, in step 47, if the difference between the battery voltages is greater than the reference value, then the battery is considered to be in the low voltage state, and the signal to cut off the power is generated. If the difference between the battery voltages is less than the reference value, then the battery is considered to be in the normal state.

Figure 5:
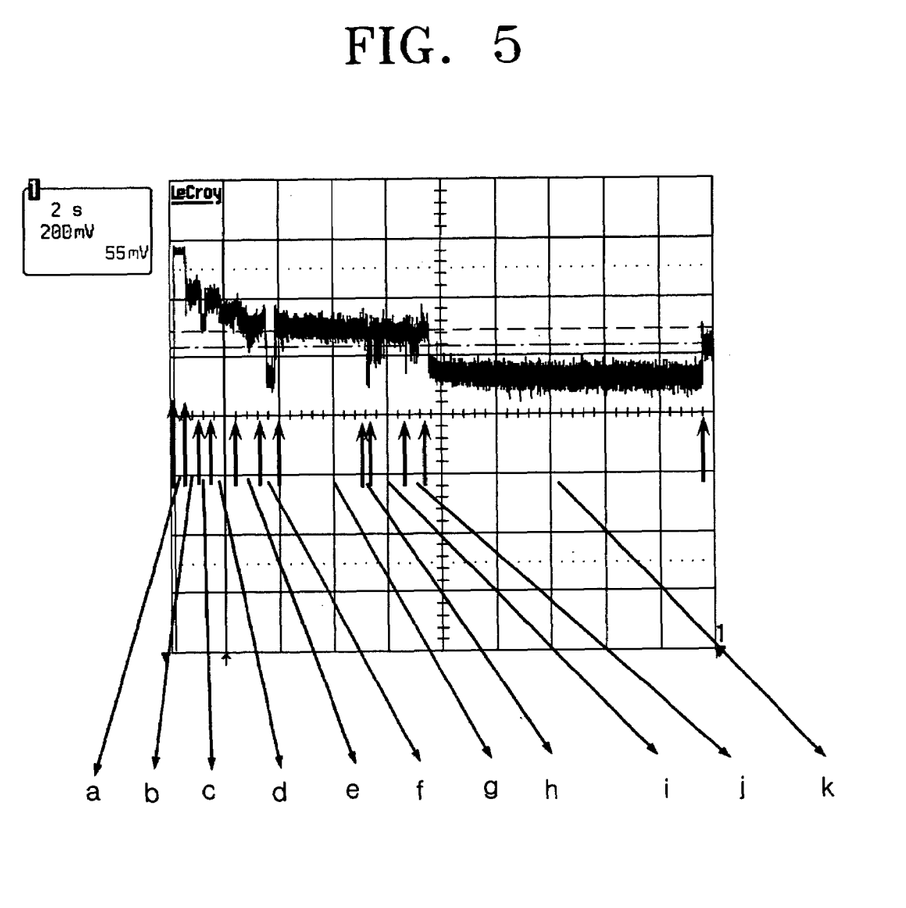
FIG. 5 is a graph showing a battery voltage check section according to the present invention.

FIG. 5 is a graph showing a battery voltage check section according to the present invention. The battery voltage check section is classified into a booting period and a period after booting is completed. A check method used in each section is previously programmed and stored in the low battery voltage determination unit 13. The booting period includes sections a through f, and the period after booting is performed includes sections g through k. Here, section a is a key check section, section b is an on-time section of a power supply unit, an LCD, and a CCD, section c is an Iris and shutter driving section, section d is a zoon motor driving and reverse-break section, section e is a booting sound and LCD backlight on section, section f is a flash capacitor charging and focusing section at an initial stage of booting, section g is a stabilization section after booting, section h is a shutter 1 section, section i is an Iris interworking section including shutter 1, section j is a shutter 2 section including a shutter sound, and section k is a flash capacitor charging section after photographing in a light-emitting mode, respectively. In the present invention, preferably, during the booting period, at least one of sections b and f is used, and during the period after booting is completed, at least one of sections g, h, and k is used. In other words, in the present invention, section b corresponds to the first sub-section, section f corresponds to the second sub-section, section g corresponds to the third sub-section, section h corresponds to the fourth sub-section, and section k corresponds to the fifth sub-section, respectively.

Figure 6:
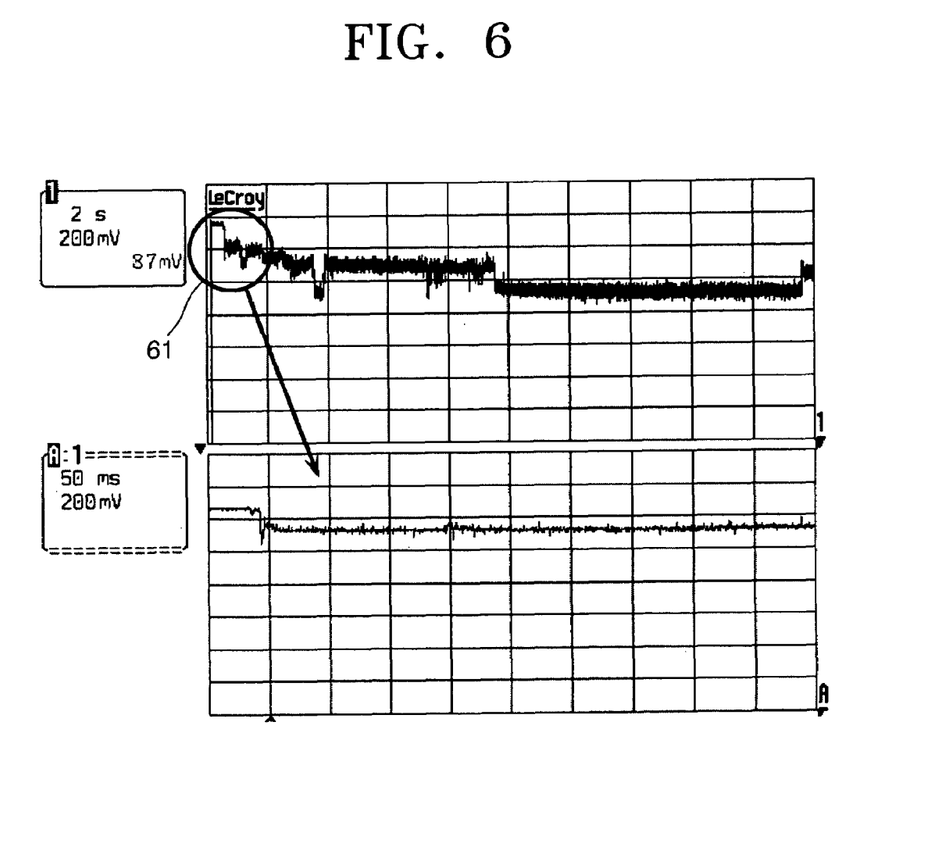
FIG. 6 is an enlarged graph showing a first check voltage of FIG. 5.

FIG. 6 is an enlarged graph showing a first check voltage in a first sub-section of FIG. 5. The first check voltage in the first sub-section is detected with respect to section b 61 at the check point CP. The first check voltage is used to determine whether an alkaline battery is actually used. The alkaline battery voltage used in the digital camera ranges from about 3V to 2V, and the voltage where the battery voltage is divided exactly in half, that is, maximum 1.5V to minimum 1.0V is a detection object voltage at the check point CP. Section b 61 is a section where the driving of the LCD, the CCD, and the power supply unit starts, and a voltage in section b 61 is set to a first check voltage. In this case, if a reference value of the first check voltage is set to about 1.17V and the first check voltage is less than 1.17V, then the state of the battery is considered to be in a low voltage state, and the power of the digital camera is automatically cut off.

Figure 7:
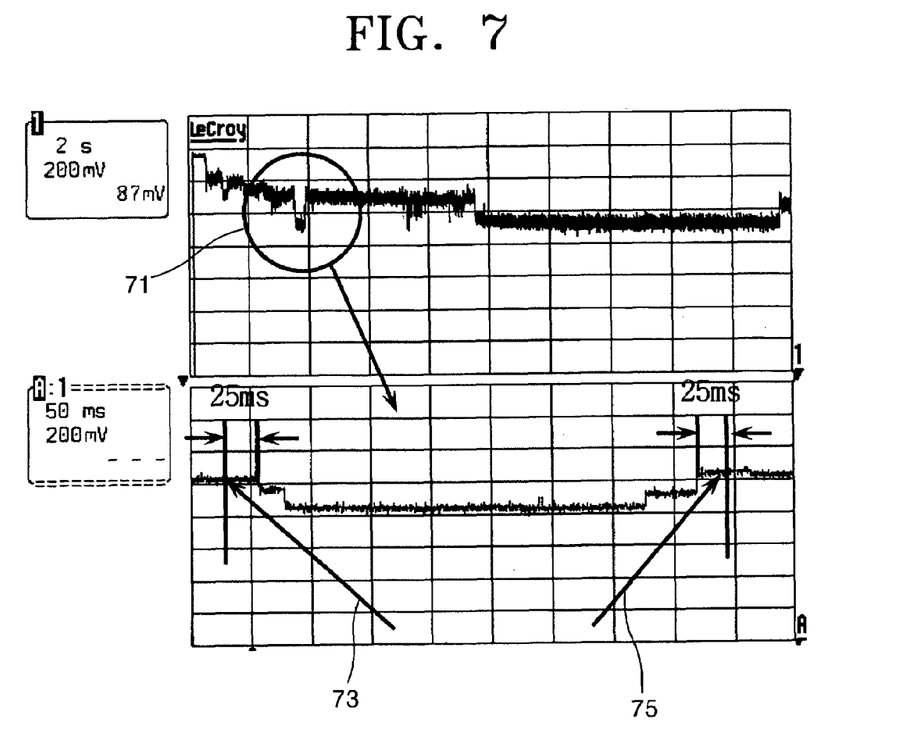
FIG. 7 is an enlarged graph showing a second check voltage of FIG. 5.

FIG. 7 is an enlarged graph showing a second check voltage in a second sub-section of FIG. 5. The second check voltage is detected with respect to section f 71 at the check point CP. If it is determined that the first check voltage detected in the first sub-section is in the normal state, then the first check voltage is considered an internally stable power source, and while the initial booting is continuously occurring, the second check voltage is measured. In a charging section of a flash capacitor, that is, section f 71 set during an initial booting period, a larger amount of current consumption compared to other sections occurs. If the battery is in a low voltage state, there is a distinguishable difference between the battery voltage at a predetermined time, for example, 25 ms prior to a charging section of the flash capacitor and the battery voltage at the predetermined time, for example, 25 ms after the charging section of the flash capacitor. Thus, voltages before and after flash capacitor charging at two check points 73 and 75 before and after a predetermined time of a section where charging is actually performed, respectively, are checked. If a voltage difference therebetween is smaller than a predetermined reference value, for example, about 50 mV, then the battery is considered to be in the normal state. If the voltage difference therebetween is greater than the predetermined reference value, then the battery is considered to be in a low voltage state, and the power of the digital camera is automatically cut off.

Figure 8:
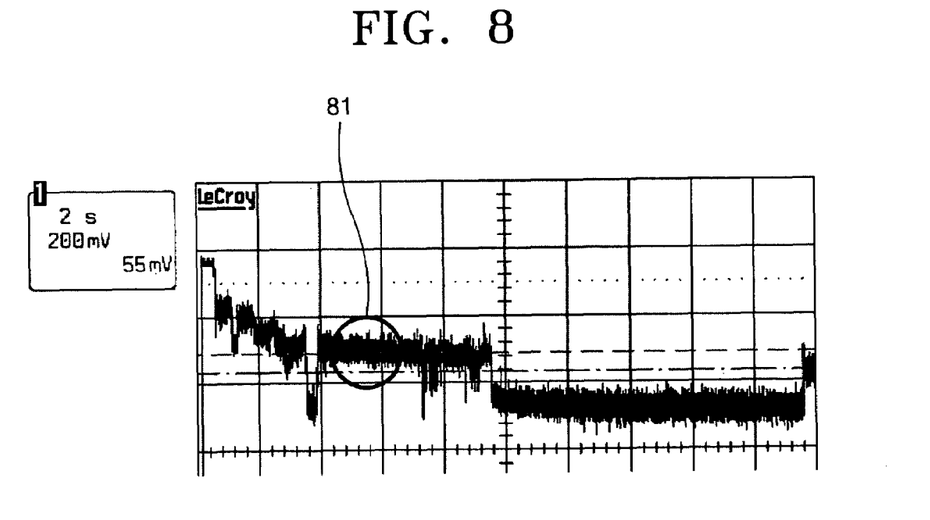
FIG. 8 is an enlarged graph showing a third check voltage of FIG. 5.

FIG. 8 is an enlarged graph showing a third check voltage in a third sub-section of FIG. 5. The third check voltage is detected with respect to section g 81 at the check point CP. If it is determined that the second check voltage detected in the second sub-section is in the normal state, then the third check voltage is measured. The third check voltage is compared with a threshold voltage, i.e., a minimum voltage of, for example, an alkaline battery at which it is possible for the mobile electronic unit to be normally operated. If the third check voltage is smaller than the threshold voltage, the third check voltage is further checked during a predetermined period, for example, within about 10 ms, a predetermined number of times, for example, at least more than twice. If each of the further-checked third check voltages is less than the threshold voltage, the state of the battery is considered to be in a low voltage state, and the power of the digital camera is automatically cut off.

Figure 9:
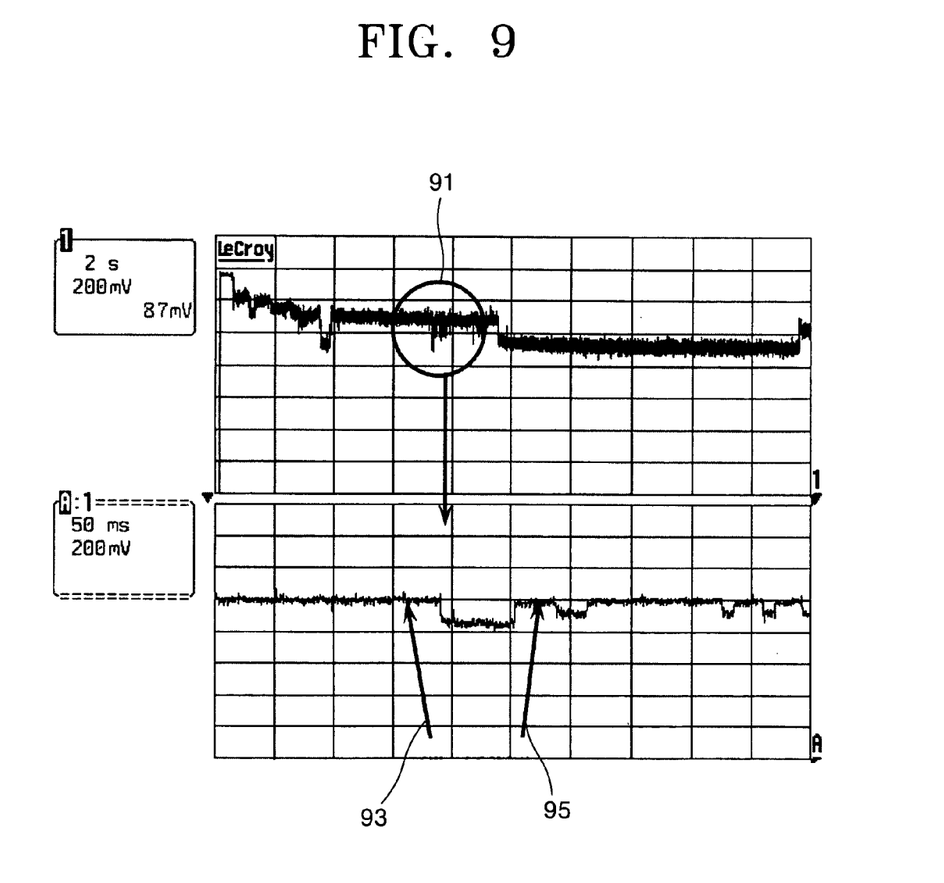
FIG. 9 is an enlarged graph showing a fourth check voltage of FIG. 5.

FIG. 9 is an enlarged graph showing a fourth check voltage in a fourth sub-section of FIG. 5. The fourth check voltage is detected with respect to section h 91 at the check point CP. The first through third check voltages are voltages checked during the booting period and during the period after booting is completed, whereas the fourth check voltage is a voltage check with respect to each operation mode generated after booting is completed. In other words, in a photographing mode where the most amount of current consumption occurs, e.g., when a voltage drop occurs in shutter 1. Like in the second check voltage, if a voltage difference detected at two check points 93 and 95 that are set at a point 25 ms before a shutter 1 operation mode and at a point 25 ms after the shutter 1 operation mode, is smaller than a predetermined reference value, for example, about 50 mV, then the state of the battery is considered to be in a normal state. If the voltage difference is greater than the predetermined reference value, the state of the battery is considered to be in a low voltage state, and the power of the digital camera is automatically cut off.

Figure 10:
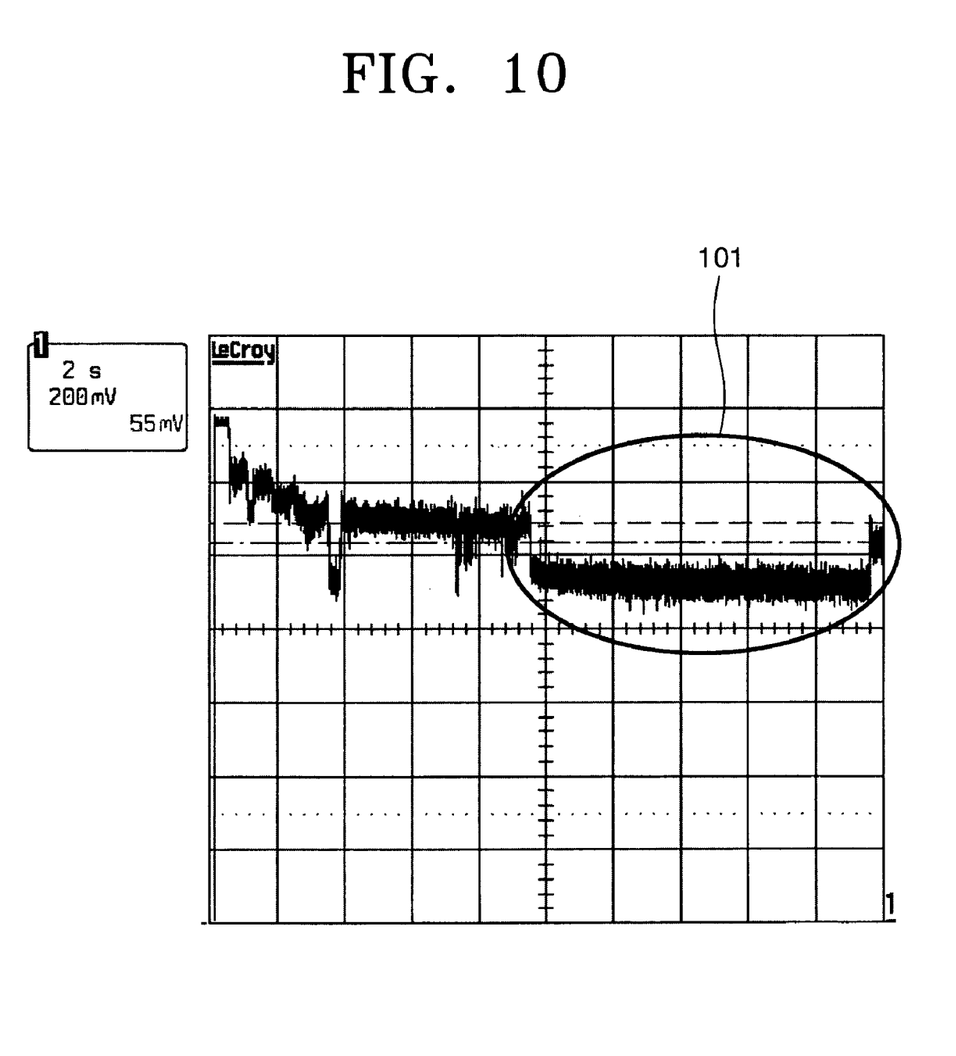
FIG. 10 is an enlarged graph showing a fifth check voltage of FIG. 5.

FIG. 10 is an enlarged graph showing a fifth check voltage in a fifth sub-section of FIG. 5. The fifth check voltage is detected with respect to section k 101 at the check point CP. Even though it is determined that all of the first through fourth check voltages are in the normal state, remarkable voltage drop occurs after photographing in a maximum light-emitting mode in a low voltage state. Thus, voltages are checked before and after flash capacitor charging at two check points, before and after a predetermined time, for example, 25 ms of a section where charging of the flash capacitor is actually performed after photographing in the maximum light-emitting mode, respectively. If a voltage difference therebetween is smaller than a predetermined reference value, for example, about 50 mV, then the state of the battery is considered to be in the normal state. If the voltage difference therebetween is greater than the predetermined reference value, the state of the battery is considered to be in a low voltage state, and the power of the digital camera is automatically cut off.

In addition, in all sections after booting is completed, that is, sections h through k, a battery voltage detected for a predetermined time, for example, two seconds whenever a corresponding operation is performed, is compared with a threshold voltage, i.e., a minimum voltage of, for example, an alkaline battery at which it is possible for the mobile electronic unit to be normally operated. If the detected battery voltage is less than the threshold voltage for a predetermined number of times, for example, at least more than three times, the power of the digital camera is automatically cut off.

In the above-described embodiment, the first through fifth check voltages are sequentially checked to determine whether the battery is in a low voltage state. However, the second check voltage and the fourth check voltage are sequentially checked, or the second check voltage, the fourth check voltage, and the fifth check voltage are sequentially checked to determine whether the battery is in the low voltage state. In addition, the first and second check sections and the first through fifth sub-sections may be diversely set according to the specification of the corresponding mobile electronic unit.

In the above-described embodiments, the digital camera has been shown. However, the method of automatically cutting off power according to the present invention can be used in a mobile electronic unit, such as a personal digital assistant (PDA) and a mobile phone in which both a primary battery and a secondary battery are used, without modifying hardware of the mobile electronic unit.

The present invention can be realized as a computer-readable code on a computer-readable recording medium. A computer-readable medium may be any kind of recording medium in which computer-readable data is stored. Examples of such computer-readable media include ROMs, RAMs, CD-ROMs, magnetic tapes, floppy discs, optical data storing devices, and carrier waves (e.g., transmission via the Internet), and so forth. Also, the computer-readable code can be stored on the computer-readable media distributed in computers connected via a network. Furthermore, functional programs, codes, and code segments for realizing the present invention can be easily analogized by programmers skilled in the art.

In a mobile electronic unit in which both a primary battery and a secondary battery are used, a low voltage state of a battery may cause the malfunctioning of some of the elements of the unit, in particular, the digital signal processing unit and the microcontroller. As described above, embodiments of the present invention detect when a low voltage state of a battery exists during the booting period and at predetermined intervals after booting is completed, and the power of the mobile electronic unit is automatically cut off, so that damage of the respective elements is prevented and a stable operation of the mobile electronic unit is guaranteed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of automatically cutting off power in a mobile electronic unit comprising:
cutting off the power of the mobile electronic unit when a battery voltage is detected in a first check section as not being in a normal state during a booting period of the mobile electronic unit;
  (a1) checking the battery voltage before a predetermined time from a starting time of the first check section;
  (a2) checking the battery voltage after a predetermined time from an ending time of the first check section; and
  (a3) generating a power cutting off signal when a difference between the battery voltages checked in steps (a1) and (a2) is more than a predetermined reference value.

2. The method of claim 1, further comprising cutting off the power of the mobile electronic unit when the battery voltage detected in the first check section is in the normal state and when a battery voltage is detected in a second check section as not being in a normal state during a period of time after the booting period of the mobile electronic unit is completed.

3. The method of claim 1, further comprising comparing a battery voltage detected during a performance period of an operation mode where a current higher than a standard consumption current is used with a threshold voltage and generating a power cutting off signal when the detected battery voltage is less than the threshold voltage for more than a predetermined number of times.

4. A method of automatically cutting off power in a mobile electronic unit comprising cutting off the power of the mobile electronic unit when a battery voltage is detected in a first check section as not being in a normal state during a booting period of the mobile electronic unit, wherein the first check section includes at least one of a first sub-section, corresponds to an on-time section of primary elements at an initial stage of booting, and a second sub-section includes a driving period of elements where a current higher than a standard consumption current is used, the method further comprising;
  (a) generating a power cutting off signal when a battery voltage checked in the first sub-section is less than a first reference value; and
  (b) generating the power cutting off signal when the battery voltage checked in the first sub-section is areater than the first reference value, and when a difference between the battery voltage detected before a predetermined time from a starting time of the second sub-section and the battery voltage detected after a predetermined time from an ending time of the second sub-section is greater than a second reference value.

5. A method of automatically cutting off power in a mobile electronic unit comprising:
cutting off the power of the mobile electronic unit when a battery voltage is detected in a first check section as not being in a normal state during a booting period of the mobile electronic unit, and
  cutting off the power of the mobile electronic unit when the battery voltage detected in the first check section is in the normal state and when a battery voltage is detected in a second check section as not being in a normal state during a period of time after the booting period of the mobile electronic unit is completed, wherein the second check section includes one of a third sub-section which corresponds to a stabilization period after booting of the mobile electronic unit is completed, a fourth sub-section including a driving period of elements at an initial stage of a predetermined operation mode, and a fifth sub-section including a performance period of an operation mode where a current higher than a standard consumption current is used.

6. The method of claim 5 further comprising:
(a) checking the battery voltage before a predetermined time from a starting time of the fourth sub-section;
(b) checking the battery voltage after a predetermined time from an ending time of the fourth sub-section; and
(c) generating a power cutting off signal when a difference between the battery voltages checked in steps (a) and (b) is greater than a predetermined reference value.

7. The method of claim 6 further comprising comparing a battery voltage detected during the third sub-section with a threshold voltage and generating a power cutting off signal when the detected battery voltage is less than the threshold voltage for more than a predetermined number of times.

8. The method of claim 5 further comprising:
(a) generating the power cutting off signal when a difference between the battery voltage detected before a predetermined time from a starting time of the fourth sub-section and the battery voltage detected after a predetermined time from an ending time of the fourth sub-section is greater than a first reference value; and
(b) generating the power cutting off signal when a difference between the battery voltage detected before a predetermined time from the starting time of the fifth sub-section and the battery voltage detected after a predetermined time from an ending time of the fifth sub-section is greater than a second reference value.

9. The method of claim 8 further comprising comparing a battery voltage detected during the third sub-section with a threshold voltage and generating a power cutting off signal when the detected battery voltage is less than the threshold voltage for more than a predetermined number of times.

10. The method of claim 5 further comprising:
(a) comparing a battery voltage detected during the third sub-section with a threshold voltage and generating a power cutting off signal when the detected battery voltage is less than the threshold voltage for more than a predetermined number of times; and
(b) generating the power cutting off signal when a difference between the battery voltages in step (a) is greater than the threshold voltage and when a difference between the battery voltage detected before a predetermined time from the starting time of the fourth sub-section and the battery voltage detected after a second predetermined time from the ending time of the fourth sub-section is greater than a first reference value; and
(c) generating the power cutting off signal when a difference between the battery voltages in step (b) is less than a first reference value and when a difference between the battery voltage detected before a predetermined time from the starting time of the fifth sub-section and the battery voltage detected after a predetermined time from the ending time of the fifth sub-section is greater than a second reference value.

11. A computer-readable recording medium comprising:
a program for cutting off the power of the mobile electronic unit when a battery voltage detected in a first check section is not in a normal state during a booting period of the mobile electronic unit; and
a program for cutting off the power of the mobile electronic unit when the battery voltage detected with respect to the first check section is in the normal state and when a battery voltage detected in a second check section is not in the normal state during a period after booting of the mobile electronic unit is completed.

12. The computer-readable recording medium of claim 11, further comprising a program for cutting off the power of the mobile electronic unit when the battery voltage detected in the first check section is in the normal state and when a battery voltage is detected in a second check section as not being in a normal state during a period of time after the booting period of the mobile electronic unit is completed.

13. The computer-readable recording medium of claim 12, wherein the second check section includes at least one of a third sub-section which corresponds to a stabilization period after booting of the mobile electronic unit is completed, a fourth sub-section including a driving period of elements at an initial stage of a predetermined operation mode, and a fifth sub-section including a performance period of an operation mode where a current higher than a standard consumption current is used.

14. The computer-readable recording medium of claim 13 further comprising:
(a) a program for checking the battery voltage before a predetermined time from a starting time of the fourth sub-section;
(b) a program for checking the battery voltage after a predetermined time from an ending time of the fourth sub-section; and
(c) a program for generating a power cutting off signal when a difference between the battery voltages checked by the programs in (a) and (b) is greater than a predetermined reference value.

15. The computer-readable recording medium of claim 14 further comprising a program for comparing a battery voltage detected during the third sub-section with a threshold voltage and generating a power cutting off signal when the detected battery voltage is less than the threshold voltage for more than a predetermined number of times.

16. The computer-readable recording medium of claim 13 further comprising:
(a) a program for generating the power cutting off signal when a difference between the battery voltage detected before a predetermined time from a starting time of the fourth sub-section and the battery voltage detected after a predetermined time from an ending time of the fourth sub-section is greater than a first reference value; and
(b) a program for generating the power cutting off signal when a difference between the battery voltage detected before a predetermined time from the starting time of the fifth sub-section and the battery voltage detected after a predetermined time from an ending time of the fifth sub-section is greater than a second reference value.

17. The computer-readable recording medium of claim 16 further comprising a program for comparing a battery voltage detected during the third sub-section with a threshold voltage and generating a power cutting off signal when the detected battery voltage is less than the threshold voltage for more than a predetermined number of times.

18. The computer-readable recording medium of claim 13 further comprising:
(a) a program for comparing a battery voltage detected during the third sub-section with a threshold voltage and generating a power cutting off signal when the detected battery voltage is less than the threshold voltage for more than a predetermined number of times; and (b) a program generating the power cutting off signal when a difference between the battery voltages determined by the program in (a) is greater than the threshold voltage and when a difference between the battery voltage detected before a predetermined time from the starting time of the fourth sub-section and the battery voltage detected after a second predetermined time from the ending time of the fourth sub-section is greater than a first reference value; and (c) a program for generating the power cutting off signal when a difference between the battery voltages determined by the program in (b) is less than a first reference value and when a difference between the battery voltage detected before a predetermined time from the starting time of the fifth sub-section and the battery voltage detected after a predetermined time from the ending time of the fifth sub-section is greater than a second reference value.

19. The computer-readable recording medium of claim 11, further comprising a program for comparing a battery voltage detected during a performance period of an operation mode where a current higher than a standard consumption current is used with a threshold voltage and generating a power cutting off signal when the detected battery voltage is less than the threshold voltage for more than a predetermined number of times.

* * * * *